US011376549B2

(12) United States Patent
Ochi et al.

(10) Patent No.: US 11,376,549 B2
(45) Date of Patent: Jul. 5, 2022

(54) HUMIDITY CONDITIONING DEVICE AND HUMIDITY CONDITIONING METHOD

(71) Applicant: SHARP KABUSHIKI KAISHA, Sakai (JP)

(72) Inventors: Sho Ochi, Sakai (JP); Tetsuya Ide, Sakai (JP); Makoto Yamada, Sakai (JP); Hiroka Hamada, Sakai (JP); Jun Sakuma, Sakai (JP); Tsuyoshi Kamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 82 days.

(21) Appl. No.: 16/959,915

(22) PCT Filed: Dec. 27, 2018

(86) PCT No.: PCT/JP2018/048237
§ 371 (c)(1),
(2) Date: Jul. 2, 2020

(87) PCT Pub. No.: WO2019/135396
PCT Pub. Date: Jul. 11, 2019

(65) Prior Publication Data

US 2021/0077949 A1 Mar. 18, 2021

(30) Foreign Application Priority Data

Jan. 4, 2018 (JP) ............................ JP2018-000281

(51) Int. Cl.
*B01D 53/26* (2006.01)
*F24F 11/79* (2018.01)
(Continued)

(52) U.S. Cl.
CPC ....... *B01D 53/263* (2013.01); *B01D 53/1425* (2013.01); *B05B 17/06* (2013.01);
(Continued)

(58) Field of Classification Search
CPC .............. B01D 53/263; B01D 53/1425; B01D 2259/4508; F24F 11/79; F24F 3/14;
(Continued)

(56) References Cited

U.S. PATENT DOCUMENTS 4,429,735 A * 2/1984 Nomaguchi ........ B05B 17/0615 62/304
2001/0015072 A1* 8/2001 Assaf .................... F24F 3/1417 62/93

(Continued)

FOREIGN PATENT DOCUMENTS

JP 2001-149737 A 6/2001

*Primary Examiner* — Stephen Hobson
(74) *Attorney, Agent, or Firm* — ScienBiziP, P.C.

(57) ABSTRACT

Provided is a humidity conditioning method that enables absorption and desorption of moisture with low power consumption. The humidity conditioning method includes: an adjustment step of adjusting a moisture amount of hygroscopic liquid; and a measurement step of measuring concentration of a hygroscopic substance contained in the hygroscopic liquid, in which at the adjustment step, at least either moisture absorption processing of causing moisture contained in air to be absorbed by the hygroscopic liquid or regeneration processing of separating the moisture from the hygroscopic liquid is performed, the regeneration processing includes atomization processing of irradiating at least a part of the hygroscopic liquid with an ultrasonic wave to generate an atomized droplet from the hygroscopic liquid and perform removal, the atomized droplet contains a first droplet and a second droplet whose particle size is larger than a particle size of the first droplet, a concentration region of the hygroscopic substance relative to total mass of the hygroscopic liquid includes a first concentration region in which the first droplet is generated, and a second concentration region in which the second droplet is generated and in which concentration is lower than that in the first concentration (Continued)

region, and the moisture amount of the hygroscopic liquid is adjusted so that the concentration is included in the first concentration region on a basis of a measurement result obtained in at least the measurement step.

13 Claims, 4 Drawing Sheets

(51) Int. Cl.
*B01D 53/14* (2006.01)
*B05B 17/06* (2006.01)
*F24F 3/14* (2006.01)
*F24F 6/12* (2006.01)

(52) U.S. Cl.
CPC .................. *F24F 3/14* (2013.01); *F24F 6/12* (2013.01); *F24F 11/79* (2018.01)

(58) Field of Classification Search
CPC ...... F24F 6/12; F24F 2110/20; F24F 11/0008; F24F 3/1417; B05B 17/06; B05B 7/0081; B05B 12/004; B05B 17/0615
See application file for complete search history.

(56) References Cited

U.S. PATENT DOCUMENTS

2002/0116935 A1* 8/2002 Forkosh .................. F24F 5/001 62/93
2004/0112077 A1* 6/2004 Forkosh .................. F24F 5/001 62/271
2006/0032935 A1* 2/2006 Matsuura ............. B01D 5/0039 239/9
2007/0210186 A1* 9/2007 Fenton .................... C23C 24/04 239/428
2008/0083231 A1* 4/2008 Wang ........................ F24F 3/14 62/93
2009/0025408 A1* 1/2009 Matsui ................. F24F 11/0008 62/515
2010/0229725 A1* 9/2010 Farsad ................... B01D 53/64 261/36.1
2011/0147482 A1* 6/2011 Matsuura ................. B01D 1/14 239/102.1
2014/0260371 A1* 9/2014 Vandermeulen ...... F24F 3/1417 62/271
2014/0374929 A1* 12/2014 Fujita ...................... B01F 23/20 261/129
2015/0360965 A1* 12/2015 Forsyth ................. C01C 3/0212 423/375
2015/0362246 A1* 12/2015 Vijayan ................... F25D 21/14 62/181
2019/0338966 A1* 11/2019 Meggers ............... F24F 3/1417
2020/0278126 A1* 9/2020 Ide ........................... F24F 11/86
2020/0340692 A1* 10/2020 Ide ........................ F24F 3/1417
2020/0360957 A1* 11/2020 Sakuma ..................... F24F 6/12
2021/0053010 A1* 2/2021 Sakuma ............. B01D 53/1425
2021/0113958 A1* 4/2021 Sakuma ................ F24F 3/1417
2021/0129076 A1* 5/2021 Ochi .................... B01D 53/263

* cited by examiner

HUMIDITY CONDITIONING DEVICE AND HUMIDITY CONDITIONING METHOD

TECHNICAL FIELD

The present invention relates to a humidity conditioning device and a humidity conditioning method.

This application claims priority based on Japanese Patent Application No. 2018-000281 filed in Japan on Jan. 4, 2018, the content of which is incorporated herein.

BACKGROUND ART

A humidity conditioning element with an absorbent is conventionally known and widely used in a humidity conditioning device or the like (refer to PTL 1). The humidity conditioning element includes a support body that has, for example, a honeycomb shape or a corrugated cardboard shape and many air flow paths are formed by the support body.

Moreover, on a surface of the support body, a powdery adsorbent made of an inorganic material such as zeolite, silica gel, or activated carbon is held by a binder. When air flows in an air flow path of the humidity conditioning element, the absorbent absorbs water vapor or the like in the air so that the air is able to be dried.

CITATION LIST

Patent Literature

PTL 1: Japanese Unexamined Patent Application Publication No. 2001-149737

SUMMARY OF INVENTION

Technical Problem

For repetitive use, a dehumidifier (humidity conditioning device) described in PTL 1 needs to absorb (absorb) moisture from air to be processed and then desorb (separate) the absorbed moisture to recover performance of absorbing moisture. However, since a conventional dehumidifier that uses a dehumidifying agent (absorbent) brings a change in a state of moisture from liquid to gas when the absorbed moisture is desorbed, energy that is equal to or more than an amount of latent heat of absorbed water needs to be added. Thus, the conventional dehumidifier has a problem that a large amount of power is consumed.

An aspect of the invention is made in view of such circumstances and an object thereof is to provide a humidity conditioning device and a humidity conditioning method that enable absorption and desorption of moisture with low power consumption.

Solution to Problem

The inventors have focused on water separation utilizing atomization with use of an ultrasonic wave. The inventors have examined a device that irradiates hygroscopic liquid, which absorbs moisture, with an ultrasonic wave to generate an atomized droplet from the hygroscopic liquid, and removes the atomized droplet to thereby separate the moisture from the hygroscopic liquid. Such a device does not bring a change in a state of the moisture from liquid to gas when the moisture is desorbed. Thus, the device described above is able to perform absorption and desorption of the moisture with low power consumption.

The inventors have found that a humidity conditioning method and a humidity conditioning device that have the following aspects are able to suppress leakage of a hygroscopic substance contained in hygroscopic liquid and keep dehumidification efficiency even after repetitive use, and have completed the invention.

An aspect of the invention provides a humidity conditioning method including: an adjustment step of storing, in an adjustment tank, hygroscopic liquid that contains a hygroscopic substance and adjusting a moisture amount of the hygroscopic liquid; and a measurement step of measuring concentration of the hygroscopic substance that is contained in the hygroscopic liquid stored in the adjustment tank, in which at the adjustment step, at least either moisture absorption processing of making the hygroscopic liquid contact with air and causing moisture contained in the air to be absorbed by the hygroscopic liquid or regeneration processing of separating the moisture from the hygroscopic liquid that has absorbed the moisture is performed, the regeneration processing includes atomization processing of irradiating at least a part of the hygroscopic liquid with an ultrasonic wave to generate an atomized droplet from the hygroscopic liquid that has absorbed the moisture and perform removal, the atomized droplet contains a first droplet and a second droplet whose particle size is larger than a particle size of the first droplet, a concentration region of the hygroscopic substance relative to total mass of the hygroscopic liquid includes a first concentration region in which the first droplet is generated, and a second concentration region in which the second droplet is generated and in which concentration is lower than that in the first concentration region, and the moisture amount of the hygroscopic liquid is adjusted so that the concentration is included in the first concentration region on a basis of a measurement result obtained in at least the measurement step.

In an aspect of the invention, the method may be such that at the measurement step, an actual refractive index of the hygroscopic liquid stored in the adjustment tank is measured, and on a basis of a correspondence relationship between known concentration of the hygroscopic substance relative to the total mass of the hygroscopic liquid and a refractive index of the hygroscopic liquid, the concentration is measured from the actual refractive index.

In an aspect of the invention, the method may be such that at the measurement step, actual viscosity of the hygroscopic liquid stored in the adjustment tank is measured, and on a basis of a correspondence relationship between known concentration of the hygroscopic substance relative to the total mass of the hygroscopic liquid and viscosity of the hygroscopic liquid, the concentration is measured from the actual viscosity.

In an aspect of the invention, the method may be such that at the measurement step, actual density of the hygroscopic liquid stored in the adjustment tank is measured, and on a basis of a correspondence relationship between known concentration of the hygroscopic substance relative to the total mass of the hygroscopic liquid and density of the hygroscopic liquid, the concentration is measured from the actual density.

In an aspect of the invention, the method may be such that at the measurement step, an actual volume of the hygroscopic liquid stored in the adjustment tank is measured, and on a basis of a correspondence relationship between known concentration of the hygroscopic substance relative to the total mass of the hygroscopic liquid and a volume of the hygroscopic liquid, the concentration is measured from the actual volume.

In an aspect of the invention, the method may be such that in the concentration region in which concentration is lower than that in the first concentration region, an amount of the moisture to be absorbed in the moisture absorption processing is made less than an amount of the moisture separated in the regeneration processing.

In an aspect of the invention, the method may be such that in the concentration region in which the concentration is lower than that in the first concentration region, the adjustment step is performed while heating the hygroscopic liquid.

In an aspect of the invention, the method may be such that only the regeneration processing is performed in a case of first setting concentration included in the second concentration region.

In an aspect of the invention, the method may be such that the regeneration processing includes evaporation processing of heating and evaporating the moisture contained in the hygroscopic liquid, and the evaporation processing is performed in a case of second setting concentration lower than the first setting concentration.

In an aspect of the invention, the method may be such that the regeneration processing includes evaporation processing of heating and evaporating the moisture contained in the hygroscopic liquid, and in a case where the second droplet is detected, the evaporation processing is performed.

In an aspect of the invention, the method may be such that the second droplet is separated and collected.

In an aspect of the invention, the method may be such that a wind direction is adjusted so that air containing the second droplet does not blow onto a person.

An aspect of the invention provides a humidity conditioning device including: an adjustment unit that has an adjustment tank in which hygroscopic liquid containing a hygroscopic substance is stored and adjusts a moisture amount of the hygroscopic liquid that is stored; and a measurement unit that measures concentration of the hygroscopic substance that is contained in the hygroscopic liquid stored in the adjustment tank, in which the adjustment unit includes absorption means of sending air outside the adjustment unit to an inner space of the adjustment unit, making the air contact with the hygroscopic liquid in the inner space, and causing moisture contained in the air be absorbed by the hygroscopic liquid, an ultrasonic wave generation unit that irradiates at least a part of the hygroscopic liquid, which has absorbed the moisture, with an ultrasonic wave, a heating unit that heats the hygroscopic liquid that has absorbed the moisture, and removal means of removing an atomized droplet generated from the hygroscopic liquid that has absorbed the moisture, the atomized droplet contains a first droplet and a second droplet whose particle size is larger than a particle size of the first droplet, a concentration region of the hygroscopic substance relative to total mass of the hygroscopic liquid includes a first concentration region in which the first droplet is generated, and a second concentration region in which the second droplet is generated and in which concentration is lower than that in the first concentration region, and the moisture amount of the hygroscopic liquid is adjusted so that the concentration is in the first concentration region on a basis of a measurement result obtained by at least the measurement unit.

Advantageous Effects of Invention

According to an aspect of the invention, a humidity conditioning device and a humidity conditioning method that enable absorption and desorption of moisture with low power consumption are provided.

DESCRIPTION OF EMBODIMENTS

<First Embodiment>

Figure 1:
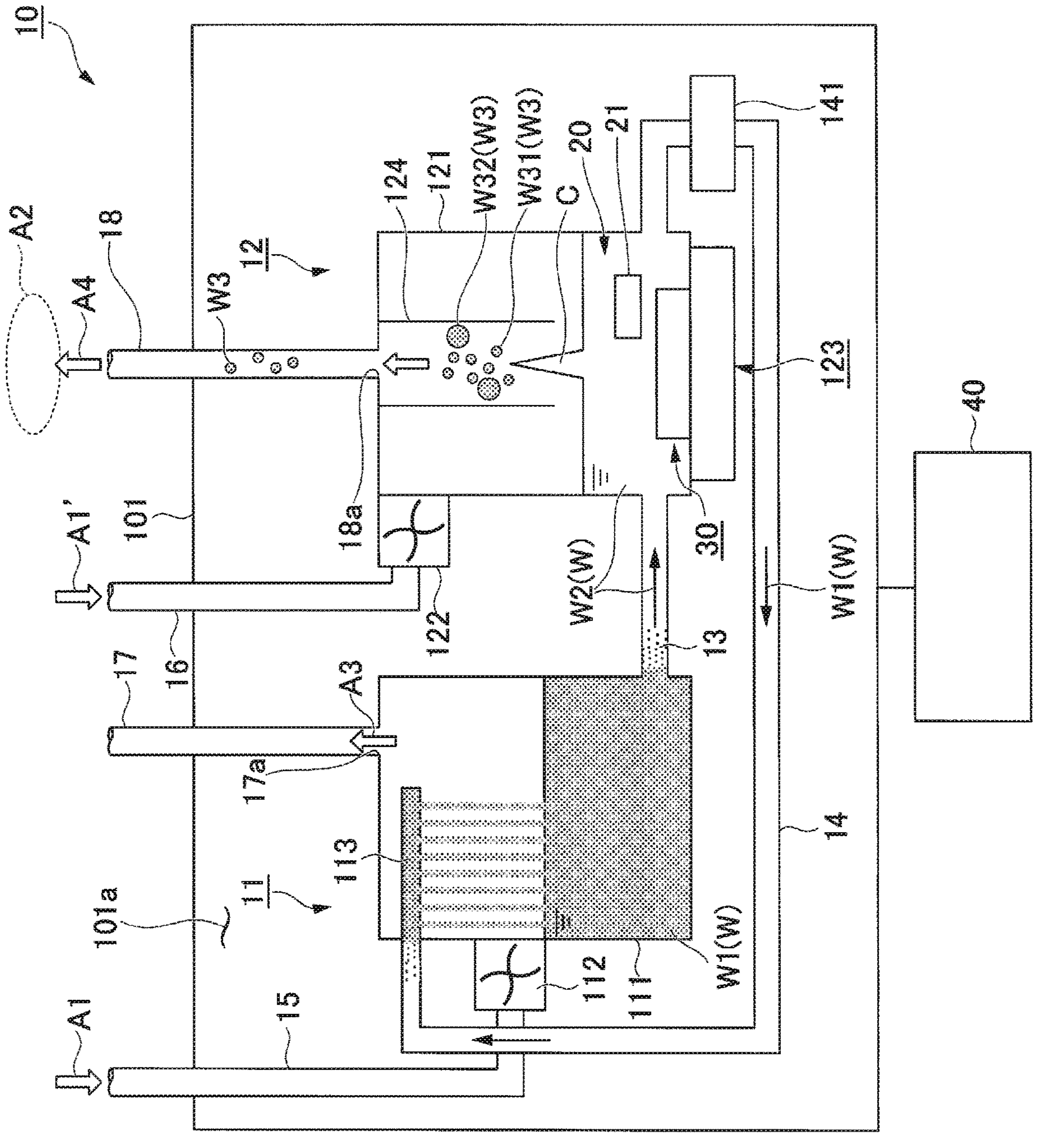
FIG. 1 illustrates a schematic configuration of a humidity conditioning device 10 of a first embodiment.

A humidity conditioning device and a humidity conditioning method in a first embodiment of the invention will be described below with reference to FIG. 1.

Note that, in the drawings used in the following description, for the purpose of emphasizing a feature portion, the feature portion may be illustrated in an enlarged manner for convenience, and a dimensional ratio or the like of components is not always the same as an actual one. Furthermore, for a similar purpose, illustration of a portion other than the feature portion may be omitted.

The humidity conditioning method of the present embodiment includes: an adjustment step of storing, in an adjustment tank, hygroscopic liquid that contains a hygroscopic substance and adjusting a moisture amount of the hygroscopic liquid; and a measurement step of measuring concentration of the hygroscopic substance contained in the hygroscopic liquid stored in the adjustment tank. At the adjustment step, at least either moisture absorption processing of making the hygroscopic liquid contact, with air and causing moisture contained in the air to be absorbed by the hygroscopic liquid or regeneration processing of separating the moisture from the hygroscopic liquid that has absorbed the moisture is performed.

In the present specification, "regeneration" means that moisture is separated from hygroscopic liquid that has absorbed the moisture and performance of absorbing the moisture of the hygroscopic liquid is recovered.

[Humidity Conditioning Device]

FIG. 1 illustrates a schematic configuration of a humidity conditioning device 10 of the first embodiment. As illustrated in FIG. 1, the humidity conditioning device 10 of the present embodiment includes a housing 101, a moisture absorption unit 11, a regeneration unit 12, a first liquid transport flow path 13, a second. Liquid transport flow path 14, a first air supply flow path 15, a second air supply flow path 16, a first air discharge flow path 17, a second air discharge flow path 18, a measurement unit 20, a heating unit 30, and a control unit 40.

Note that, a collection unit that collects an atomized droplet W3 described later may be provided in the second air discharge flow path 18.

The moisture absorption unit 11, the regeneration unit 12, the first liquid transport flow path 13, and the second liquid transport flow path 14 in the present embodiment correspond to an adjustment unit in the claims.

The housing 101 of the present embodiment includes an inner space 101*a*. The housing 101 of the present embodiment accommodates at least the moisture absorption unit 11 and the regeneration unit 12 in the inner space 101*a*.

The moisture absorption unit 11 and the regeneration unit 12 store hygroscopic liquid W. The hygroscopic liquid W will be described later.

In the following description, liquid used for processing in the moisture absorption unit 11 is referred to as "hygroscopic liquid W1". Moreover, liquid processed in the regeneration unit 12 is referred to as "hygroscopic liquid W2". Note that, a collective configuration of the hygroscopic liquid W1 and the hygroscopic liquid W2 is referred to as the "hygroscopic liquid W".

In the present specification, the "hygroscopic liquid W2" corresponds to "hygroscopic liquid that, has absorbed the moisture" in the claims.

Moreover, in the following description, air processed in the moisture absorption unit 11 is referred to as "air A1". Air discharged from the moisture absorption unit 11 is referred to as "air A3". Air supplied from the regeneration unit 12 is referred to as "air A1". Air discharged from the regeneration unit 12 is referred to as "air A4". Air mixed with the "air A4" is referred to as "air A2". Note that, the air A1 and the air A1' may exist in the same space or different spaces.

Through the first liquid transport flow path 13 and the second liquid transport flow path 14, the hygroscopic liquid W is transported. Through the first liquid transport flow path 13, the hygroscopic liquid W is transported from the moisture absorption unit 11 to the regeneration unit 12. Through the second liquid transport flow path 14, the hygroscopic liquid W is transported from the regeneration unit 12 to the moisture absorption unit 11. A pump 141 that circulates the hygroscopic liquid W is connected to a middle of the second liquid transport flow path 14.

The first air supply flow path 15 establishes communication between an inner space of the moisture absorption unit 11 and an outside of the housing 101. Through the first air supply flow path 15, the air A1 is supplied from the outside of the housing 101 to the inner space of the moisture absorption unit 11.

The second air supply flow path 16 establishes communication between an inner space of the regeneration unit 12 and the outside f the housing 101. Through the second air supply flow path 16, the air A1' is supplied from the outside of the housing 101 to the inner space of the regeneration unit 12.

The first air discharge flow path 17 establishes communication between the inner space of the moisture absorption unit 11 and the outside of the housing 101. Through the first air discharge flow path 17, the air A3 is discharged from the inner space of the moisture absorption unit 11 to the outside of the housing 101.

The second air discharge flow path 18 establishes communication between the inner space of the regeneration unit 12 and the outside of the housing 101. Through the second air discharge flow path 18, the air A4 is discharged from the inner space of the regeneration unit 12 to the outside of the housing 101.

(Moisture Absorption Unit)

The moisture absorption unit 11 sends the air A1 outside the housing 101 to the inner space of the moisture absorption unit 11 so that the air A1 is brought into contact with the hygroscopic liquid W1 in the inner space and moisture contained in the air A1 is absorbed by the hygroscopic liquid W1. The moisture absorption unit 11 includes a moisture absorption tank 111, a blower 112, and a nozzle unit 113.

In the present specification, a collective configuration of the blower 112 and the nozzle unit 113 corresponds to "absorption means" in the claims.

The moisture absorption tank 111 stores the hygroscopic liquid W1. The blower 112 and the first air discharge flow path 17 are connected to an upper part of the moisture absorption tank 111. The second liquid transport flow path 14 is connected to the moisture absorption tank 111 in a part above a liquid surface of the hygroscopic liquid W1. The first liquid transport flow path 13 is connected to the moisture absorption tank 111 in a part below the liquid surface of the hygroscopic liquid W1.

One end of the first air supply flow path 15 connected to the blower 112. On the other hand, the other end of the first air supply flow path 15 is arranged in the outside of the housing 101.

The blower 112 supplies the air A1 to an inner space of the moisture absorption tank 111 via the first air supply flow path 15. The air A1 delivered by the blower 112 forms an air flow directed from the blower 112 to a discharge port 17*a* of the first air discharge flow path 17.

The nozzle unit 113 causes the hygroscopic liquid W1 to drop in a substantially circular shape in a gravity direction in the inner space of the moisture absorption tank 111. At this time, in the inner space of the moisture absorption tank 111, since the air flow of the air A1 is generated by the blower 112, the air A1 and the hygroscopic liquid W1 are able to be brought into contact with each other. In this manner, the moisture contained in the air A1 is absorbed by the hygroscopic liquid W1. A contact system of the air A1 and the hygroscopic liquid W1 in the present embodiment is typically called a flow-down system. The nozzle unit 113 is arranged above the liquid surface of the hygroscopic liquid W1 stored in the moisture absorption tank 111. The nozzle unit 113 is connected to the other end of the second liquid transport flow path 14.

The air A3 obtained by the moisture absorption unit 11 is obtained by removing the moisture from the air A1 and is thus drier than the air A1.

(Regeneration Unit)

The regeneration unit 12 irradiates a part of the hygroscopic liquid W2 with an ultrasonic wave and generates the atomized droplet W3 from the hygroscopic liquid W2 to thereby remove moisture from the hygroscopic liquid W2. The regeneration unit 12 includes a regeneration tank 121, a blower 122, an ultrasonic wave generation unit 123, and a guide pipe 124.

In the present specification, the regeneration tank 121 corresponds to an "adjustment tank" in the claims.

In the present specification, a collective configuration of the blower 122 and the guide pipe 124 corresponds to "removal means" in the claims.

The regeneration tank 121 stores the hygroscopic liquid W2. The blower 122 and the second air discharge flow path 18 are connected to an upper part of the regeneration tank 121. The first liquid transport flow path 13 and the second liquid transport flow path 14 are connected to the regeneration tank 121 in a part below a liquid surface of the hygroscopic liquid W2.

One end of the second air supply flow path 16 is connected to the blower 122. On the other hand, the other end of the second air supply flow path 16 is arranged in the outside of the housing 101.

The blower 122 supplies the air A1' to the inner space of the regeneration tank 121 via the second air supply flow path 16. The air A1' supplied by the blower 122 forms an air flow directed from the blower 122 to a discharge port 18*a* of the second air discharge flow path 18.

The ultrasonic wave generation unit 123 irradiates a part of the hygroscopic liquid W2 with an ultrasonic wave and generates, from the hygroscopic liquid W2, the atomized droplet W3 that contains moisture. The ultrasonic wave generation unit 123 in FIG. 1 is in contact with the regeneration unit 12 in a lower part (−Z direction) of the regeneration tank 121. Note that, the ultrasonic wave generation unit 123 has one vibrator in FIG. 1, but may have two or more vibrators.

When the ultrasonic wave generation unit 123 irradiates the hygroscopic liquid W2 with the ultrasonic wave, a liquid column C of the hygroscopic liquid W2 is generated in the liquid surface of the hygroscopic liquid W2 in some cases. A large number of atomized droplets W3 described above are generated from the liquid column C.

The ultrasonic wave generation unit 123 is planarly overlapped with the discharge port 18*a* of the second air discharge flow path 18 when the humidity conditioning device 10 is viewed from above. According to such a positional relationship between the ultrasonic wave generation unit 123 and the discharge port 18*a*, when the humidity conditioning device 10 is viewed from above, the liquid column C is generated at a position where the ultrasonic wave generation unit 123 is planarly overlapped with the discharge port 18*a*.

By controlling a condition under which the ultrasonic wave is radiated, the ultrasonic wave generation unit 123 is able to control a generation amount and a particle size of the atomized droplet W3. Specific examples of the condition under which the ultrasonic wave is radiated include a frequency of the ultrasonic wave and input power of the ultrasonic wave generation unit 123.

The frequency of the ultrasonic wave is preferably in a range of, for example, 1.0 MHz or more and 5.0 MHz or less. When the frequency of the ultrasonic wave is in the range, the generation amount of the atomized droplet W3 is able to be increased. When the frequency of the ultrasonic wave is 1.0 MHz or more, the particle size of the atomized droplet W3 is able to be reduced.

The input power of the ultrasonic wave generation unit 123 is preferably, for example, 2 W or more and more preferably 10 W or more for one vibrator. When the input power of the ultrasonic wave generation unit 123 is 2 W or more, the number of surface waves formed in an interface of gas and liquid is sufficiently increased. This makes it possible to increase the generation amount of the atomized droplet W3.

The humidity conditioning device 10 is able to control the generation amount of the atomized droplet W3 also by adjusting depth from a surface of the ultrasonic wave generation unit 123 to the Liquid surface of the hygroscopic liquid W2.

Depth from a bottom surface of the regeneration tank 121 to the liquid surface of the hygroscopic liquid W2 is preferably in a range of 1 cm or more and 6 cm or less. When the depth is 1 cm or more, a risk of empty heating is low and the generation amount of the atomized droplet W3 is able to be sufficiently increased. Moreover, when the depth is 6 cm or less, the liquid column C of the hygroscopic liquid W2 is easily generated. As a result, the atomized droplet W3 is able to be efficiently generated.

The guide pipe 124 guides, to the discharge port 18*a* of the second air discharge flow path 18, the atomized droplet W3 generated from the hygroscopic liquid W2. When the humidity conditioning device 10 is viewed from above, the guide pipe 124 planarly surrounds the discharge port 18*a* of the second air discharge flow path 18.

In the regeneration unit 12, according to a positional relationship among the ultrasonic wave generation unit 123, the guide pipe 124, and the discharge port 18*a*, the guide pipe 124 surrounds the liquid column C. Thereby, an air flow directed upward from the liquid surface of the hygroscopic liquid W2 conveys, to the discharge port 18*a*, the atomized droplet W3 generated from the liquid column C The air A4 obtained by the regeneration unit 12 contains the generated atomized droplet W3, and is thus more humid than the air A2 outside the housing 101.

(Heating Unit)

The heating unit 30 is able to heat the hygroscopic liquid W. The heating unit 30 is immersed in the hygroscopic liquid W2 in an inside of the regeneration tank 121. The hygroscopic liquid W heated by the heating unit 30 is transported by the pump 141 from the regeneration tank 121 to the moisture absorption tank 111. An example of the heating unit 30 includes a throw-in heater.

(Hygroscopic Liquid)

The hygroscopic liquid W of the present embodiment is liquid that exhibits hygroscopicity and is preferably liquid that exhibits hygroscopicity at 25° C. and a relative humidity of 50%, and under atmospheric pressure.

The hygroscopic liquid W of the present embodiment contains a hygroscopic substance. Moreover, the hygroscopic liquid W of the present embodiment may contain a hygroscopic substance and a solvent. As such a solvent, a solvent that dissolves the hygroscopic substance or that is mixed with the hygroscopic substance is used, and an example thereof includes water.

The hygroscopic substance may be an organic material or an inorganic material.

Examples of the organic material used as the hygroscopic substance include dihydric or higher alcohol, ketone, an organic solvent having amide group, saccharides, and a known material used as a raw material for moisturizing cosmetics etc.

Particularly, the dihydric or higher alcohol, the organic solvent having amide group, the saccharides, or the known material used as the raw material for moisturizing cosmetics etc. is preferable as the organic material used as the hygroscopic substance because of having high hydrophilicity.

Examples of the dihydric or higher alcohol include glycerin, propanediol, butanediol, pentanedial, trimethylolpropane, butanetriol, ethylene glycol, diethylene glycol, and triethylene glycol.

Examples of the organic solvent having amide group include formamide and acetamide.

Examples of the saccharides include sucrose, pullulan, glucose, xylol, fructose, mannitol, and sorbitol.

Examples of the known material used as the raw material for moisturizing cosmetics etc. include 2-methacryloyloxyethyl phosphoryl choline (MPC), betaine, hyaluronic acid, and collagen.

Examples of the inorganic material used as the hygroscopic substance include calcium chloride, lithium chloride, magnesium chloride, potassium chloride, sodium chloride, zinc chloride, aluminum chloride, lithium bromide, calcium bromide, potassium bromide, sodium hydroxide, and sodium pyrrolidone carboxylate.

In a case where hydrophilicity of the hygroscopic substance is high, for example, when such a material is mixed with water, a ratio of water molecules in a vicinity of a surface (liquid surface) of the hygroscopic liquid W is high. The regeneration unit 12 generates the atomized droplet W3 from the vicinity of the surface of the hygroscopic liquid W2 to separate moisture from the hygroscopic liquid W2. Thus, when the ratio of water molecules in the vicinity of the surface of the hygroscopic liquid W is high, the moisture is able to be efficiently separated.

Moreover, a ratio of the hygroscopic substance in the vicinity of the surface of the hygroscopic liquid W becomes relatively low. Thus, it is possible to suppress leakage of the hygroscopic substance at the regeneration step.

Viscosity of the hygroscopic liquid W of the present embodiment is preferably 50 mPa·s or less at 20° C. Thereby, the liquid column C of the hygroscopic liquid W2 is easily generated in the liquid surface of the hygroscopic liquid W2. Thus, the moisture is able to be efficiently separated from the hygroscopic liquid W2. Moreover, the viscosity of the hygroscopic liquid W of the present embodiment may for example, 1 mPa·s or more at 20° C.

In addition, since the contact system of the air A1 and the hygroscopic liquid W1 in the present embodiment is the flow-down system, even when the viscosity of the hygroscopic liquid W is on a higher end of the range, the hygroscopic liquid W1 is able to be efficiently brought into contact with the air A1.

Leakage of the hygroscopic substance contained in the hygroscopic liquid W can be raised as one of causes of reduction of dehumidification efficiency of the humidity conditioning device 10. For keeping the dehumidification efficiency of the humidity conditioning device 10, it is effective to suppress the leakage of the hygroscopic substance.

The particle size of the atomized droplet W3 is affected by the frequency of the ultrasonic wave, a type of the hygroscopic liquid W, concentration of the hygroscopic substance in the hygroscopic liquid W, or the like. In particular, as the concentration of the hygroscopic substance in the hygroscopic liquid W is high, the viscosity may be increased. In such a case, energy required for breakage of a surface wave formed in the interface of liquid and gas is increased. With the increase in the energy, the particle size of the atomized droplet W3 is considered to be reduced. An intermolecular force between a water molecule and a hygroscopic substance is weaker than an intermolecular force between water molecules. Thus, as the particle size of the atomized droplet W3 is reduced, the atomized droplet W3 is difficult to contain the hygroscopic substance. According to such a relationship among the concentration of the hygroscopic substance in the hygroscopic liquid W, the particle size of the atomized droplet W3, and possibility of containing the hygroscopic substance, the inventors have found that the leakage of the hygroscopic substance is able to be suppressed by controlling a range of the concentration of the hygroscopic substance in the hygroscopic liquid W to be a high range and have completed the invention. Note that, in the present specification, unless otherwise indicated, the concentration of the hygroscopic substance in the hygroscopic liquid W means concentration of the hygroscopic substance relative to total mass of the hygroscopic liquid W stored in the regeneration tank 121.

Figure 2:
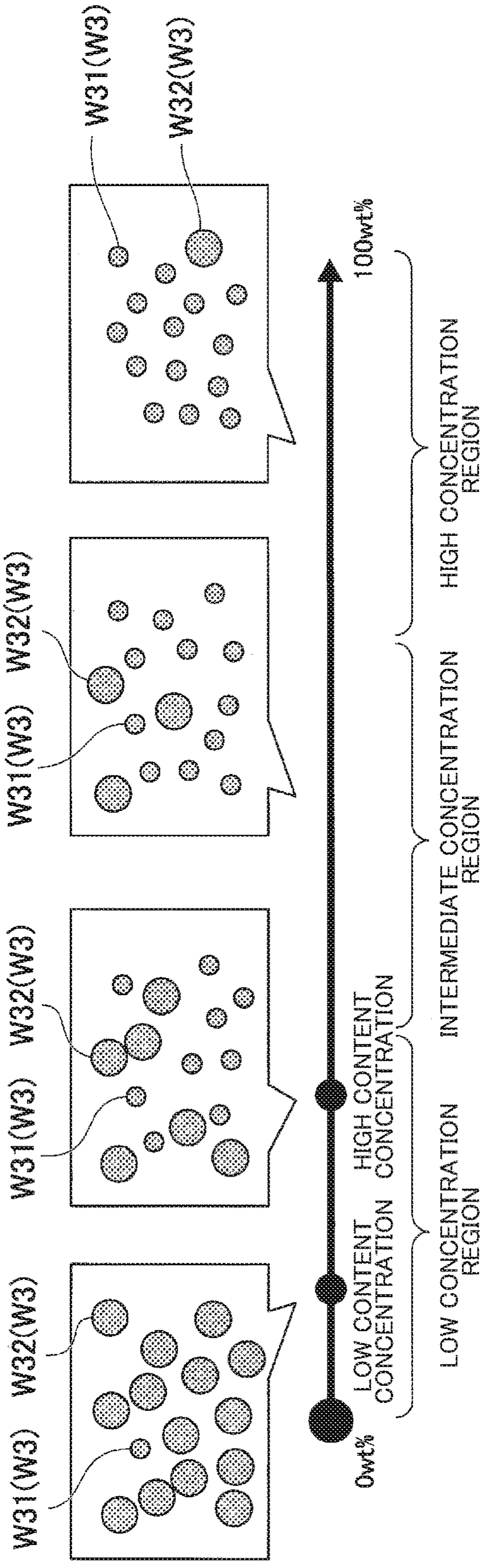
FIG. 2 illustrates a relationship between concentration of a hygroscopic substance in hygroscopic liquid W and a particle size of an atomized droplet.

Here, a relationship between the concentration of the hygroscopic substance in the hygroscopic liquid W and the particle size of the atomized droplet will be described specifically with reference to FIG. 2. FIG. 2 illustrates the relationship between the concentration of the hygroscopic substance in the hygroscopic liquid W and the particle size of the atomized droplet. As illustrated in FIG. 2, a concentration region of the hygroscopic substance in the hygroscopic liquid W is constituted by a high concentration region, a low concentration region, and an intermediate concentration region. The low concentration region is a concentration region where the concentration of the hygroscopic substance in the hygroscopic liquid W is lower than that in the high concentration region. The intermediate concentration region is a concentration region between the high concentration region and the low concentration region.

The high concentration region of the present embodiment corresponds to a first concentration region in the claims. The low concentration region of the present embodiment corresponds to a second concentration region in the claims.

In a case where the concentration of the hygroscopic substance in the hygroscopic liquid W is included in the high concentration region, an average particle size of atomized droplets W3 tends to be reduced. At this time, an atomized droplet whose particle size is small is easily generated from the hygroscopic liquid W. Such an atomized droplet with the small particle size is referred to as a minute droplet W31.

In a case where the concentration of the hygroscopic substance in the hygroscopic liquid W is included in the low concentration region, an average particle size of atomized droplets W3 tends to be increased. At this time, an atomized droplet whose particle size is larger than that of the minute droplet is easily generated from the hygroscopic liquid W. Such an atomized droplet with the large particle size is referred to as a coarse droplet W32.

In a case where the concentration of the hygroscopic substance in the hygroscopic liquid W is included in the intermediate concentration region, an average particle size of atomized droplets W3 is between the average particle size of atomized droplets W3 in the high concentration region and the average particle size of atomized droplets W3 in the low concentration region. At this time, the minute droplet W31 and the coarse droplet W32 are generated from the hygroscopic liquid W.

The low concentration region includes high content concentration and low content concentration whose concentration is lower than the high content concentration. At the high content concentration positioned in the low concentration region so as to be closer to the intermediate concentration region, it is considered that an amount of the coarse droplet W32 contained in the atomized droplet W3 is relatively small and influence of the leakage of the hygroscopic substance is small as compared to a case of the low content concentration described below. On the other hand, at the low content concentration whose concentration is lower than the high content concentration, it is considered that the amount of the coarse droplet W32 contained in the atomized droplet W3 is relatively large and influence of the leakage of the hygroscopic substance cannot be disregarded.

In the present specification, the "high content concentration" corresponds to "first setting concentration" in the claims. The "low content concentration" corresponds to "second setting concentration" in the claims.

The minute droplet W31 corresponds to a first droplet in the claims. The coarse droplet W32 corresponds to a second droplet in the claims.

The particle size of the minute droplet W31 is in a range of submicron-order to nano-order. The particle size of the coarse droplet W32 is micron-order.

The humidity conditioning device of the present embodiment controls an amount of the moisture in the hygroscopic liquid W so that the concentration of the hygroscopic substance in the hygroscopic liquid W is included in the high concentration region where the minute droplet W31 is easily generated.

(Measurement Unit)

With reference back to FIG. 1, the measurement unit. 20 measures the concentration of the hygroscopic substance in the hygroscopic liquid W. The measurement unit 20 includes a refractometer 21 that measures an actual refractive index of the hygroscopic liquid W2. The refractometer 21 is arranged below the liquid surface of the hygroscopic liquid W2 stored in the regeneration tank 121.

Known concentration of the hygroscopic substance in the hygroscopic liquid W corresponds to a refractive index of the hygroscopic liquid W. On the basis of such a correspondence relationship, the measurement unit 20 obtains the concentration of the hygroscopic substance in the hygroscopic liquid W2 by using the actual refractive index of the hygroscopic liquid W2.

A result of the concentration of the hygroscopic substance in the hygroscopic liquid W2 is output to the control unit 40 described below.

(Control Unit)

On the basis of the concentration of the hygroscopic substance in the hygroscopic liquid W2, which is obtained by the measurement unit 20, the control unit 40 performs control so that the concentration of the hygroscopic substance in the hygroscopic liquid W2 is included in the high concentration region.

The control unit 40 controls driving at least one selected from a group consisting of the blower 112, the blower 122, the ultrasonic wave generation unit 123, the heating unit 30, and the pump 141.

(Control Method in High Concentration Region)

As described above, in the case where the concentration of the hygroscopic substance in the hygroscopic liquid W2 is included in the high concentration region, the minute droplet W31 is easily generated from the hygroscopic liquid W2. Therefore, the hygroscopic substance is less likely to leak. Thus, the driving of the blower 112 or the like does not need to be controlled by the control unit 40, but the concentration of the hygroscopic substance in the hygroscopic liquid W2 is preferably kept at a high state.

(Control Method in Intermediate Concentration Region)

As described above, n the case where the concentration of the hygroscopic substance in the hygroscopic liquid W2 is included in the intermediate concentration region, the coarse droplet W32 may be generated from the hygroscopic liquid W2. Therefore, the hygroscopic substance is likely to leak. Accordingly, in the case where the concentration of the hygroscopic substance in the hygroscopic liquid W2 is included in the intermediate concentration region, the control unit 40 uses the blower 112, the ultrasonic wave generation unit 123, the heating unit 30, or the like to make an amount of moisture absorbed by the hygroscopic liquid W1 with use of the moisture absorption unit 11 less than an amount of moisture removed from the hygroscopic liquid W2 with use of the regeneration unit 12. This makes it possible to increase the concentration of the hygroscopic substance in the hygroscopic liquid W2.

For example, the control unit 40 reduces power of the blower 112 to reduce a supply amount of the air A1, as compared to the case where the concentration of the hygroscopic substance in the hygroscopic liquid W2 is included in the high concentration region. This makes it possible to reduce the amount of the moisture absorbed by the hygroscopic liquid W1 with use of the moisture absorption unit 11.

As another method, the control unit 40 adjusts the irradiation condition of the ultrasonic wave generation unit. 123 described above to increase the generation amount of the atomized droplet W3, as compared to the case where the concentration of the hygroscopic substance in the hygroscopic liquid W2 is included in the high concentration region. This makes it possible to increase the amount of the moisture removed from the hygroscopic liquid W2 with use of the regeneration unit 12.

As another method, while the hygroscopic liquid W is heated by using the heating unit 30, the hygroscopic liquid W is circulated between the moisture absorption tank 111 and the regeneration tank 121 by the pump 141. In a case where the hygroscopic liquid W is heated, the amount of the moisture absorbed by the hygroscopic liquid W with use of the moisture absorption unit 11 is reduced and the amount of the moisture removed from the hygroscopic liquid W2 with use of the regeneration unit 12 is increased, as compared to a case where the hygroscopic liquid W is not heated. This makes it possible to make the amount of the moisture absorbed by the hygroscopic liquid W1 with use of the moisture absorption unit 11 less than the amount of the moisture removed from the hygroscopic liquid W2 with use of the regeneration unit 12.

(Control Method in Low Concentration Region)

As described above, in the case where the concentration of the hygroscopic substance in the hygroscopic liquid W2 is included in the low concentration region, the coarse droplet W32 is easily generated from the hygroscopic liquid W2. Therefore, the hygroscopic substance is more likely to leak. Thus, in the case where the concentration of the hygroscopic substance in the hygroscopic liquid W2 is included in the low concentration region, the control unit 40 makes the amount of the moisture absorbed by the hygroscopic liquid W1 with use of the moisture absorption unit 11 almost zero so that an amount of moisture is only the amount of the moisture removed from the hygroscopic liquid W2 with use of the regeneration unit 12. This makes it possible to increase the concentration of the hygroscopic substance in the hygroscopic liquid W2.

For example, the control unit 40 makes the supply amount of the air A1 almost zero by stopping the blower 112. This makes it possible to make the amount of the moisture absorbed by the hygroscopic liquid W1 with use of the moisture absorption unit 11 almost zero.

(Control Method in Case of High Content Concentration Included in Low Concentration Region)

As described above, in the case of the high content concentration positioned in the low concentration region so as to be closer to the intermediate concentration region, the amount of the coarse droplet W32 contained in the atomized droplet W3 is relatively small. Therefore, in the case where the concentration of the hygroscopic substance in the hygroscopic liquid W2 is the high content concentration, it is considered that the hygroscopic substance is more likely to leak, but the hygroscopic substance is less likely to leak as compared to the case of the low content concentration. Thus, in the case where the concentration of the hygroscopic substance in the hygroscopic liquid W2 is the high content concentration, the control unit 40 uses the ultrasonic wave generation unit 123 to generate the atomized droplet W3 from the hygroscopic liquid W2 and perform removal. At this time, as described above, while the hygroscopic liquid W is heated by using the heating unit 30, the hygroscopic liquid W2 may be regenerated by the regeneration unit 12. By heating the hygroscopic liquid W, the amount of the moisture removed from the hygroscopic liquid W2 with use of the regeneration unit 12 is able to be further increased. Moreover, in addition to the aforementioned method, the generation amount of the atomized droplet W3 may be increased by adjusting the irradiation condition of the ultrasonic wave generation unit 123.

(Control Method in Case of Low Content Concentration Included in Low Concentration Region)

As described above, in the case of the low content concentration lower than the high content concentration, the amount of the coarse droplet W32 contained in the atomized droplet W3 is relatively large. Therefore, in the case where the concentration of the hygroscopic substance in the hygroscopic liquid W2 is the low content concentration, the hygroscopic substance is much more likely to leak, which needs to be immediately handled. Thus, in the case where the concentration of the hygroscopic substance in the hygroscopic liquid W2 is the low content concentration, the control unit 40 stops the ultrasonic wave generation unit 123 and heats and evaporates the moisture contained in the hygroscopic liquid W2 while heating the hygroscopic liquid W2 by using the heating unit 30. From a viewpoint of reducing energy consumption, the moisture is continuously heated to evaporate until the concentration of the hygroscopic substance in the hygroscopic liquid W2 reaches from the low content concentration to the high content concentration, and after reaching the high content concentration, the method is preferably switched to the method of regenerating the hygroscopic liquid W2 by using the ultrasonic wave generation unit 123.

Note that, the control method in the intermediate concentration region described above is also able to be adopted for the control method in the low concentration region. That is, in the intermediate concentration region and the low concentration region, the control unit 40 uses the blower 112, the ultrasonic wave generation unit 123, the heating unit 30, or the like to make the amount of the moisture absorbed by the hygroscopic liquid W1 with use of the moisture absorption unit 11 less than the amount of the moisture removed from the hygroscopic liquid W2 with use of the regeneration unit 12.

In a case where the humidity conditioning device 10 is applied to an air conditioner, the air A1 exists in one space (for example, indoor) and the air A2 exists in the other space (for example, outdoor). Moreover, in a case where the humidity conditioning device 10 is used as a dehumidifier, the air A1 and the air A2 exist in the same space, but the atomized droplet W3 contained in the air A4 may be collected by a collection unit that may be provided in the second air discharge flow path 18.

[Humidity Conditioning Method]

The humidity conditioning method using the humidity conditioning device 10 described above will be described below.

The humidity conditioning method of the present embodiment includes a measurement step of measuring the concentration of the hygroscopic substance in the hygroscopic liquid W2 by the measurement unit 20 and an adjustment step of storing the hygroscopic liquid W2 and adjusting the moisture amount of the hygroscopic liquid W2 by the moisture absorption unit 11, the regeneration unit 12, the measurement unit 20, the heating unit 30, and the control unit 40.

At the measurement step of the present embodiment, the refractometer 21 is used as the measurement unit 20, the actual refractive index of the hygroscopic liquid W2 is measured, and on the basis of the correspondence relationship between the known concentration of the hygroscopic substance in the hygroscopic liquid W and a refractive index of the hygroscopic liquid W, the concentration of the hygroscopic substance in the hygroscopic liquid W2 is measured from the actual refractive index of the hygroscopic liquid W2.

At the adjustment step of the present embodiment, on the basis of the measured concentration of the hygroscopic substance in the hygroscopic liquid W2, the moisture amount of the hygroscopic liquid W2 is adjusted so that the concentration of the hygroscopic substance in the hygroscopic liquid W2 is included in the high concentration region.

The adjustment step of the present embodiment includes moisture absorption processing in which the moisture absorption unit 11 or the like makes the hygroscopic liquid W1 contact with the air A1 outside the housing 101 so that the hygroscopic liquid W1 absorbs the moisture and regeneration processing in which the regeneration unit 12 or the like separates the moisture from the hygroscopic liquid W2.

In the moisture absorption processing of the present embodiment, the blower 112 is driven by the control unit 40 and the air A1 outside the housing 101 is supplied to the inner space of the moisture absorption tank 111. At this time, in the inner space of the moisture absorption tank 111, an air flow of the air A1 is formed. On the other hand, the hygroscopic liquid W1 regenerated in the regeneration tank 121 is transported from the regeneration tank 121 to the moisture absorption tank 111 by the pump 141, and then gravitationally drops from the nozzle unit 113 in the inner space of the moisture absorption tank 111. Thereby, the hygroscopic liquid W1 is brought into contact with the air A1 and moisture contained in the air A1 is absorbed by the hygroscopic liquid W1. The air A3 obtained by removing the moisture from the air A1 is discharged to the outside of the housing 101 from the discharge port 17*a* of the first air discharge flow path 17.

The regeneration processing of the present embodiment includes atomization processing in which the ultrasonic wave generation unit 123 or the like irradiates a part of the hygroscopic liquid W2 with the ultrasonic wave to generate the atomized droplet W3 from the hygroscopic liquid W2 and perform removal and evaporation processing in which the heating unit 30 or the like heats and evaporates the moisture contained in the hygroscopic liquid W2.

In the atomization processing of the present embodiment, the control unit 40 drives the ultrasonic wave generation unit 123 to irradiate a part of the hygroscopic liquid W2 with the ultrasonic wave and generate the atomized droplet W3 from the hygroscopic liquid W2. On the other hand, the atomization processing of the present embodiment, the control unit 40 drives the blower 122 to supply the air A1 outside the housing 101 to the inner space of the regeneration tank 121 via the second air supply flow path 16. At this time, in the inner space of the regeneration tank 121, an air flow directed from the blower 122 to the discharge port 18*a* of the second air discharge flow path 18 is formed. The air flow discharges the air A4 that contains the atomized droplet W3 from the discharge port 18*a* of the second air discharge flow path 18 to the air A2 outside the housing 101. The hygroscopic liquid W1 obtained by removing the moisture is transported from the regeneration tank 121 to the moisture absorption tank 111 by the pump 141 and used again at the moisture absorption step described above.

In the evaporation processing of the present embodiment, the control unit 40 drives the heating unit 30 to heat and evaporate the moisture contained in the hygroscopic liquid W2.

In the case where the concentration of the hygroscopic substance in the hygroscopic liquid W2 is included in the intermediate concentration region or the low concentration region, at the adjustment step of the present embodiment, processing of the regeneration processing is performed with priority compared to processing of the moisture absorption processing. Specifically, at the adjustment step of the present embodiment, the control unit 40 controls the blower 112, the ultrasonic wave generation unit 123, and the heating unit 30 to make the amount of the moisture absorbed by the hygroscopic liquid W1 less than the amount of the moisture removed from the hygroscopic liquid W2. Thereby, the concentration of the hygroscopic substance in the hygroscopic liquid W2 is increased at the adjustment step of the present embodiment.

In the case where the concentration of the hygroscopic substance in the hygroscopic liquid W2 is the high content concentration included in the low concentration region, only the atomization processing is performed at the adjustment step of the present embodiment. Specifically, at the adjustment step of the present embodiment, the control unit 40 stops the blower 112 or drives the heating unit 30 to heat the hygroscopic liquid W to a temperature at which absorption by the hygroscopic liquid W1 is not performed. Thereby, the amount of the moisture absorbed by the hygroscopic liquid W1 is made almost zero. As a result, the concentration of the hygroscopic substance in the hygroscopic liquid W2 is increased.

In the case where the concentration of the hygroscopic substance in the hygroscopic liquid W2 is the low content concentration included in the low concentration region, only the evaporation processing is performed at the adjustment step of the present embodiment. Specifically, at the adjustment step of the present embodiment, the control unit 40 stops the blower 112 and drives the heating unit 30 to heat the hygroscopic liquid W. Thereby, the moisture contained in the hygroscopic liquid W2 is able to be removed while suppressing generation of the coarse droplet W32 containing the hygroscopic substance. As a result, the concentration of the hygroscopic substance in the hygroscopic liquid W2 is increased.

In the humidity conditioning method using the humidity conditioning device of the present embodiment, the ultrasonic wave is used to regenerate the hygroscopic liquid W2. Therefore, it is considered that the humidity conditioning method of the present embodiment hardly brings a change in a state of water, which is used when a hygroscopic form is regenerated by a conventional humidity conditioning method. Accordingly, the humidity conditioning method of the present embodiment enables to regenerate the hygroscopic liquid with low energy.

In the humidity conditioning method of the present embodiment, the moisture amount of the hygroscopic liquid W is adjusted so that the concentration of the hygroscopic substance in the hygroscopic liquid W2 is included in the high concentration region. This makes it possible to generate the minute droplet W31 with the small particle size and suppress leakage of the hygroscopic substance. Accordingly, the humidity conditioning method of the present embodiment enables to keep dehumidification efficiency even when the humidity conditioning device 10 is repeatedly used.

<Second Embodiment>

A humidity conditioning device and a humidity conditioning method in a second embodiment of the invention will be described below with reference to FIG. 3.

[Humidity Conditioning Device]

Figure 3:
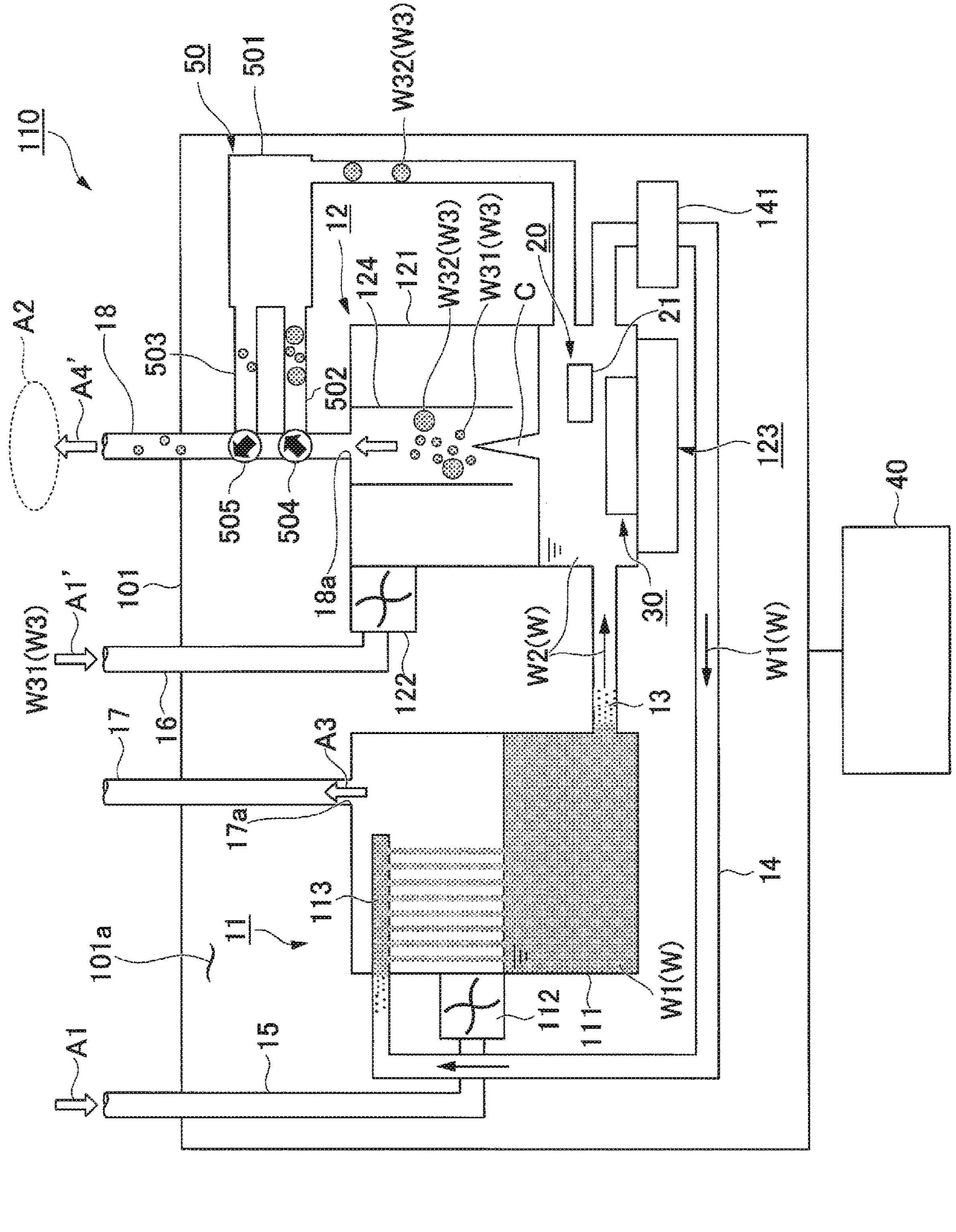
FIG. 3 illustrates a schematic configuration of a humidity conditioning device 110 of a second embodiment.

FIG. 3 illustrates a schematic configuration of a humidity conditioning device 110 of the second embodiment. As illustrated in FIG. 3, the humidity conditioning device 110 of the second embodiment includes the housing 101, the moisture absorption unit 11, the regeneration unit 12, the first liquid transport flow path 13, the second liquid transport flow path 14, the first air supply flow path. 15, the second air supply flow path 16, the first air discharge flow path 17, the second air discharge flow path 18, the measurement unit 20, the heating unit 30, the control unit 40, and a separation unit 50. Accordingly, a component common to that of the first embodiment will be denoted by the same reference sign in the present embodiment, and detailed description thereof will be omitted.

In the case where the concentration of the hygroscopic substance in the hygroscopic liquid W2 is included in the intermediate concentration region or the low concentration region, a ratio of the coarse droplet W32 containing the hygroscopic substance relative to the atomized droplet W3 is considered to be higher than that in the case where the concentration of the hygroscopic substance in the hygroscopic liquid W2 is included in the high concentration region.

(Separation Unit 50)

The separation unit 50 separates and collects the coarse droplet W32 from the air A4 containing the atomized droplet W3. The separation unit 50 includes a separation device 501, a first air transport flow path 502, a second air transport flow path 503, a first switching unit 504, a second switching unit 505, and a droplet return flow path 506.

Through the first air transport flow path 502, the air A4 containing the atomized droplet W3 is transported from the second air discharge flow path 18 to the separation device 501. The first air transport flow path 502 is arranged in a middle of the second air discharge flow path 18 and connected to the separation device 501.

Through the second air transport flow path 503, air A4° after being separated by the separation device 501 is transported from the separation device 501 to the second air discharge flow path 18. The second air transport flow path 503 is arranged in a middle of the second air discharge flow path 18 and connected to the separation device 501.

The first air transport flow path 502 is arranged in the second air discharge flow path 18 so as to be closer to the regeneration tank 121 than to the second air transport flow path 503.

The first switching unit 504 switches the second air discharge flow path 18 and the first air transport flow path 2.

The second switching unit 505 switches the second air discharge flow path 18 and the second air transport flow path 503.

Through the droplet return flow path 506, the coarse droplet W32 collected by the separation device 501 is returned to the regeneration tank 121. The droplet return flow path 506 connects the separation device 501 and the regeneration tank 121.

The separation device 501 separates and collects the coarse droplet W32 from the air A4 containing the atomized droplet W3.

Examples of the separation device 501 include a known mist separator and a known membrane module having a gas permeable membrane. Examples of the known mist separator include a cyclone separator, a mist separator of a mesh type called a "demister", and a mist separator of a wave plate type called "chevron".

[Humidity Conditioning Method]

A humidity conditioning method using the humidity conditioning device 110 described above will be described below. Similarly to the first embodiment, the humidity conditioning method of the present embodiment includes a measurement step and an adjustment step. In the humidity conditioning method of the present embodiment, in the case where the concentration of the hygroscopic substance in the hygroscopic liquid W2 is included in the intermediate concentration region or the low concentration region, the control unit 40 drives the first switching unit 504 and the second switching unit 505. The first switching unit 504 performs switch to the first air transport flow path 502 so that the regeneration tank 121 and the separation device 501 are connected. On the other hand, the second switching unit 505 performs switch to the second air transport flow path 503 so that the separation device 501 and the outside of the housing 101 are connected.

To the separation device 501, the air A4 containing the atomized droplet W3 is transported via the first air transport flow path 502. The separation device 501 separates and collects the coarse droplet W32 from the air A4. The air A4' obtained by removing the coarse droplet W32 from the air A4 is discharged to the outside of the housing 101 via the second air transport flow path 503 and the second air discharge flow path 18. On the other hand, the collected coarse droplet W32 is returned to the regeneration tank 121 via the droplet return flow path 506.

Similarly to the humidity conditioning method of the first embodiment, the humidity conditioning method using the humidity conditioning device of the present embodiment enables to regenerate the hygroscopic liquid with low energy.

Similarly to the humidity conditioning method of the first embodiment, the humidity conditioning method of the present embodiment enables to generate the minute droplet W31 with the small particle size. Additionally, even if the coarse droplet W32 containing the hygroscopic substance is generated, the humidity conditioning method of the present embodiment enables to collect the coarse droplet W32 containing the hygroscopic substance by using the separation unit. Therefore, the humidity conditioning method of the present embodiment enables to further suppress leakage of the hygroscopic substance, as compared to the humidity conditioning method of the first embodiment. Accordingly, the humidity conditioning method of the present embodiment enables to further keep dehumidification efficiency even when the humidity conditioning device 110 is repeatedly used.

<Third Embodiment>

A humidity conditioning device and a humidity conditioning method in a third second embodiment of the invention will be described below with reference to FIG. 4.

[Humidity Conditioning Device]

Figure 4:
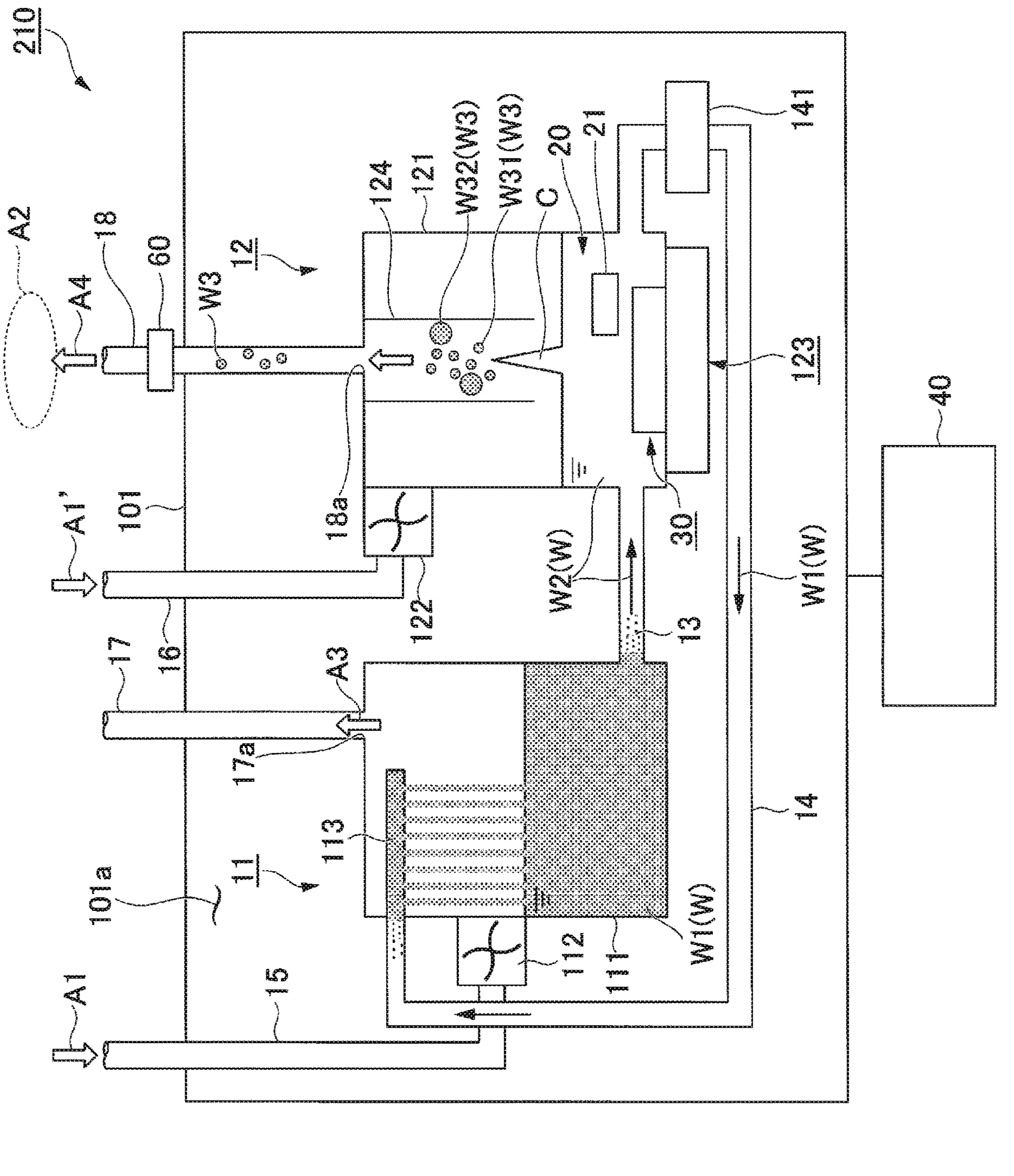
FIG. 4 illustrates a schematic configuration of a humidity conditioning device 210 of a third embodiment.

FIG. 4 illustrates a schematic configuration of a humidity conditioning device 210 of the third embodiment. As illustrated in FIG. 4, the humidity conditioning device 210 of the third embodiment includes the housing 101, the moisture absorption unit 11, the regeneration unit 12, the first liquid transport flow path 13, the second liquid transport flow path 14, the first air supply flow path 15, the second air supply flow path 16, the first air discharge flow path 17, the second air discharge flow path 18, the measurement unit 20, the heating unit 30, the control unit 40, and a detection unit 60. Accordingly, a component common to that of the second embodiment will be denoted by the same reference sign in the present embodiment, and detailed description thereof will be omitted.

(Detection Unit)

The detection unit 60 detects the coarse droplet W32 that contains the hygroscopic substance contained in the atomized droplet W3. The detection unit 60 is arranged in a middle of the second air discharge flow path 18. Examples of the detection unit 60 include a light-scattering particle size measuring machine and an electrostatic particle size measuring machine.

[Humidity Conditioning Method]

A humidity conditioning method using the humidity conditioning device 210 described above will be described below. Similarly to the first embodiment, the humidity conditioning method of the present embodiment includes a measurement step and an adjustment step. In the humidity conditioning method of the present embodiment, in a case where the detection unit 60 confirms discharge of the coarse droplet W32, the control unit 40 stops the blower 112 to stop moisture absorption processing. Additionally, the control unit 40 drives the heating unit 30 to perform evaporation processing of heating and evaporating the moisture contained in the hygroscopic liquid W2.

Similarly to the humidity conditioning method of the first embodiment, the humidity conditioning method using the humidity conditioning device of the present embodiment enables to regenerate the hygroscopic liquid with low energy.

Similarly to the humidity conditioning method of the first embodiment, the humidity conditioning method of the present embodiment enables to generate the minute droplet W31 with the small particle size. Additionally, the humidity conditioning method of the present embodiment enables to confirm discharge of the coarse droplet W32 containing hygroscopic substance by the detection unit 60. Even if discharge of the coarse droplet W32 is confirmed, the control unit 40 is able to switch atomization processing using the ultrasonic wave generation unit 123 to evaporation processing using the heating unit 30. Thereby, the humidity conditioning method of the present embodiment enables to further suppress leakage of the hygroscopic substance, as compared to the humidity conditioning method of the first embodiment. Accordingly, the humidity conditioning method of the present embodiment enables to further keep dehumidification efficiency even when the humidity conditioning device 210 is repeatedly used.

<Fourth Embodiment>

[Humidity Conditioning Method]

A humidity conditioning method in a fourth embodiment of the invention will be described below. According to the humidity conditioning method of the present embodiment, in the case where the concentration of the hygroscopic substance in the hygroscopic liquid W2 is included in the intermediate concentration region or the low concentration region, a wind direction is adjusted by the control unit 40 so that air that contains the coarse droplet W32 containing the hygroscopic substance does not blow onto a person. In the humidity conditioning method of the present embodiment, a technique of, for example, an infrared motion sensor or the like is able to be applied.

Similarly to the humidity conditioning method of the first embodiment, the humidity conditioning method using the humidity conditioning device of the present embodiment enables to regenerate the hygroscopic liquid with low energy.

Similarly to the humidity conditioning method of the first embodiment, the humidity conditioning method of the present embodiment enables to generate the minute droplet W31 with the small particle size. Additionally, according to the humidity conditioning method of the present embodiment, even if the coarse droplet W32 containing the hygroscopic substance is generated, a wind direction is able to be adjusted so that air that contains the coarse droplet W32 containing the hygroscopic substance does not blow onto a person.

Though the embodiments of the invention have been described above, configurations, a combination thereof, and the like in the embodiments are examples, and addition, omission, replacement, and another modification of a configuration may be allowed in a range not departing from the spirit of the invention. Moreover, the invention is not limited by the embodiments.

In the humidity conditioning device of an aspect of the invention, a contact system of air is not limited to the flow-down system.

The contact system of air may be a so-called stand-still system that is a system in which the hygroscopic liquid W1 stands still in an air flow of the air A1.

The contact system of air may be a so-called spray system that is a system in which the hygroscopic liquid W1 in an atomized state is sprayed in an air flow of the air A1.

The contact system of air may be a so-called bubbling system that is a system in which a bubble of the air A1 is brought into contact in the hygroscopic liquid W1.

The contact system of air may be a system in which the hygroscopic liquid W is caused to flow down to a column or honeycomb structure in an air flow of the air A1 so that the hygroscopic liquid W penetrates.

The measurement unit of the humidity conditioning device of an aspect of the invention is not limited to the refractometer and another device may be provided as long as being a device capable of measuring the concentration of the hygroscopic substance in the hygroscopic liquid.

As another device, a kinematic viscometer that measures actual viscosity of the hygroscopic liquid is also able to be used. The kinematic viscometer is arranged below the liquid surface of the hygroscopic liquid stored in the regeneration tank.

The known concentration of the hygroscopic substance in the hygroscopic liquid corresponds to viscosity of the hygroscopic liquid. On the basis of such a correspondence relationship, the measurement unit obtains the concentration of the hygroscopic substance in the hygroscopic liquid by using the actual viscosity of the hygroscopic liquid.

As another device, a densitometer that measures actual density of the hygroscopic liquid is also able to be used. As the densitometer, a so-called vibrating liquid densitometer that measures density of liquid by introducing the liquid to a vibrator in a pipe shape and measuring the number of free vibrations of the liquid is used. The densitometer is arranged below the liquid surface of the hygroscopic liquid stored in the regeneration tank. Note that, the densitometer may not be arranged at such a position as long as being capable of introducing the hygroscopic liquid to the vibrator described above.

The known concentration of the hygroscopic substance in the hygroscopic liquid corresponds to the density of the hygroscopic liquid. On the basis of such a correspondence relationship, the measurement unit obtains the concentration of the hygroscopic substance in the hygroscopic liquid by using the actual density of the hygroscopic liquid.

In a case where the hygroscopic substance is much less likely to leak, a device that measures an actual volume of the hygroscopic liquid is also able to be used as another device. Since a bottom area of the regeneration tank does not change, the volume of the hygroscopic liquid corresponds to a water level of the hygroscopic liquid in the regeneration tank. For such a reason, as the aforementioned device, a water level sensor that measures the water level of the hygroscopic liquid is also able to be used. The water level sensor is arranged below the liquid surface of the hygroscopic liquid stored in the regeneration tank.

The known concentration of the hygroscopic substance in the hygroscopic liquid corresponds to the water level of the hygroscopic liquid. On the basis of such a correspondence relationship, the measurement unit obtains the concentration of the hygroscopic substance in the hygroscopic liquid by using an actual measurement value of the water level of the hygroscopic liquid.

The invention claimed is:

1. A humidity conditioning method comprising:

an adjustment step of storing, in an adjustment tank, hygroscopic liquid that contains a hygroscopic substance and adjusting a moisture amount of the hygroscopic liquid; and a measurement step of measuring a concentration of the hygroscopic substance that is contained in the hygroscopic liquid stored in the adjustment tank, wherein at the adjustment step, at least either moisture absorption processing of making the hygroscopic liquid contact with air and causing moisture contained in the air to be absorbed by the hygroscopic liquid or regeneration processing of separating the moisture from the hygroscopic liquid that has absorbed the moisture is performed, the regeneration processing includes atomization processing of irradiating at least a part of the hygroscopic liquid with an ultrasonic wave to generate an atomized droplet from the hygroscopic liquid that has absorbed the moisture and perform removal, the atomized droplet contains a first droplet and a second droplet whose particle size is larger than a particle size of the first droplet, a concentration region of the hygroscopic substance relative to total mass of the hygroscopic liquid includes a first concentration region in which the first droplet is generated, and a second concentration region in which the second droplet is generated and in which concentration is lower than that in the first concentration region, and the moisture amount of the hygroscopic liquid is adjusted so that the concentration is included in the first concentration region on a basis of a measurement result obtained in at least the measurement step.

2. The humidity conditioning method according to claim 1, wherein at the measurement step, an actual refractive index of the hygroscopic liquid stored in the adjustment tank is measured, and on a basis of a correspondence relationship between known concentration of the hygroscopic substance relative to the total mass of the hygroscopic liquid and a refractive index of the hygroscopic liquid, the concentration is measured from the actual refractive index.

3. The humidity conditioning method according to claim 1, wherein at the measurement step, actual viscosity of the hygroscopic liquid stored in the adjustment tank is measured, and on a basis of a correspondence relationship between known concentration of the hygroscopic substance relative to the total mass of the hygroscopic liquid and viscosity of the hygroscopic liquid, the concentration is measured from the actual viscosity.

4. The humidity conditioning method according to claim 1, wherein at the measurement step, actual density of the hygroscopic liquid stored in the adjustment tank is measured, and on a basis of a correspondence relationship between known concentration of the hygroscopic substance relative to the total mass of the hygroscopic liquid and density of the hygroscopic liquid, the concentration is measured from the actual density.

5. The humidity conditioning method according to claim 1, wherein at the measurement step, an actual volume of the hygroscopic liquid stored in the adjustment tank is measured, and on a basis of a correspondence relationship between known concentration of the hygroscopic substance relative to the total mass of the hygroscopic liquid and a volume of the hygroscopic liquid, the concentration is measured from the actual volume.

6. The humidity conditioning method according to claim 1, wherein in the concentration region in which concentration is lower than that in the first concentration region, an amount of the moisture to be absorbed in the moisture absorption processing is made less than an amount of the moisture separated in the regeneration processing.

7. The humidity conditioning method according to claim 6, wherein in the concentration region in which the concentration is lower than that in the first concentration region, the adjustment step is performed while heating the hygroscopic liquid.

8. The humidity conditioning method according to claim 1, wherein only the regeneration processing is performed in a case of first setting concentration included in the second concentration region.

9. The humidity conditioning method according to claim 8, wherein the regeneration processing includes evaporation processing of heating and evaporating the moisture contained in the hygroscopic liquid, and the evaporation processing is performed in a case of second setting concentration lower than the first setting concentration.

10. The humidity conditioning method according to claim 1, wherein the regeneration processing includes evaporation processing of heating and evaporating the moisture contained in the hygroscopic liquid, and in a case where the second droplet is detected, the evaporation processing is performed.

11. The humidity conditioning method according to claim 1, wherein the second droplet is separated and collected.

12. The humidity conditioning method according to claim 1, wherein a wind direction is adjusted so that air containing the second droplet does not blow onto a person.

13. A humidity conditioning device comprising:

a moisture absorption unit, a regeneration unit, a first liquid transport flow path, and a second liquid transport flow path that has an adjustment tank in which hygroscopic liquid containing a hygroscopic substance is stored and adjusts a moisture amount of the hygroscopic liquid that is stored; and a measurement unit that measures a concentration of the hygroscopic substance that is contained in the hygroscopic liquid stored in the adjustment tank, wherein the moisture absorption unit, the regeneration unit, the first liquid transport flow path, and the second liquid transport flow path includes absorption means of sending air outside the moisture absorption unit, the regeneration unit, the first liquid transport flow path, and the second liquid transport flow path to an inner space of the moisture absorption unit, the regeneration unit, the first liquid transport flow path, and the second liquid transport flow path, making the air contact with the hygroscopic liquid in the inner space, and causing moisture contained in the air to be absorbed by the hygroscopic liquid, an ultrasonic wave generation unit that irradiates at least a part of the hygroscopic liquid, which has absorbed the moisture, with an ultrasonic wave, a heating unit that heats the hygroscopic liquid that has absorbed the moisture, and removal means of removing an atomized droplet generated from the hygroscopic liquid that has absorbed the moisture, the atomized droplet contains a first droplet and a second droplet whose particle size is larger than a particle size of the first droplet, a concentration region of the hygroscopic substance relative to total mass of the hygroscopic liquid includes a first concentration region in which the first droplet is generated, and a second concentration region in which the second droplet is generated and in which concentration is lower than that in the first concentration region, and the moisture amount of the hygroscopic liquid is adjusted so that the concentration is in the first concentration region on a basis of a measurement result obtained by at least the measurement unit.

* * * * *